United States Patent [19]

Kitada et al.

[11] Patent Number: 4,545,248
[45] Date of Patent: Oct. 8, 1985

[54] ULTRASONIC THICKNESS GAUGE

[75] Inventors: Toyohiko Kitada; Takanori Arioka, both of Tokyo, Japan

[73] Assignee: Kabushiki Kaisha Tokyo Keiki, Tokyo, Japan

[21] Appl. No.: 620,496

[22] Filed: Jun. 14, 1984

[30] Foreign Application Priority Data

Jun. 16, 1983 [JP] Japan .............................. 58-108299
Jun. 16, 1983 [JP] Japan .............................. 58-108300
Dec. 29, 1983 [JP] Japan .............................. 58-249657

[51] Int. Cl.⁴ .......................................... G01N 29/00
[52] U.S. Cl. ................................... 73/597; 73/1 DV
[58] Field of Search .............. 73/597, 624, 620, 1 DV

[56] References Cited

U.S. PATENT DOCUMENTS

| | | | |
|---|---|---|---|
| 3,504,532 | 4/1970 | Muenow et al. | 73/597 |
| 4,088,028 | 5/1978 | Hildebrandt | 73/624 |
| 4,307,611 | 12/1981 | Opara | 73/597 |
| 4,388,830 | 6/1983 | Narushima et al. | 73/597 |
| 4,437,332 | 3/1984 | Pittaro | 73/597 |

Primary Examiner—Stephen A. Kreitman
Attorney, Agent, or Firm—Koda and Androlia

[57] ABSTRACT

An ultrasonic thickness gauge including a split-type probe to perform the transmission-reception of ultrasonic waves via a material board to be measured, a zero point calibration circuit to delay the zero point by a specified delay time from the wave transmission timing, and a measuring circuit to count clock pulses for the duration from the zero point to the wave reception timing. This ultrasonic thickness gauge is characterized in that it also includes a counter to count, within specified range, the clock pulses relating to the board thickness in each previous measurement conducted by using the preset zero point, and a zero point adjusting circuit to vary the zero point of the zero point calibration circuit in proportion to the count value of the above-mentioned counter. In addition, a coefficient selecting circuit to shift the proportionality coefficient of the zero point adjusting circuit step by step in accordance with the board thickness obtained in each previous measurement may be included for measuring a wider range of board thickness.

3 Claims, 14 Drawing Figures

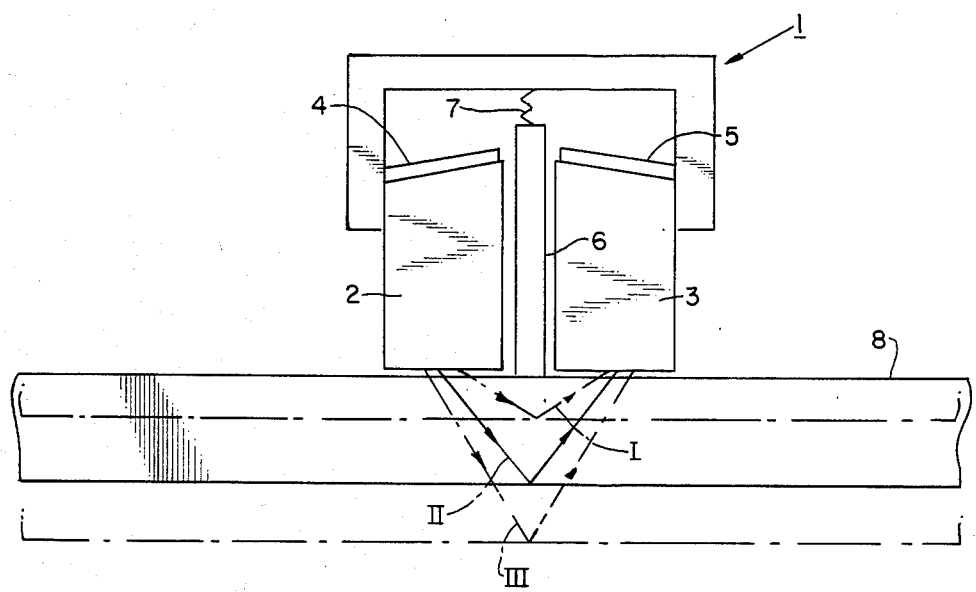
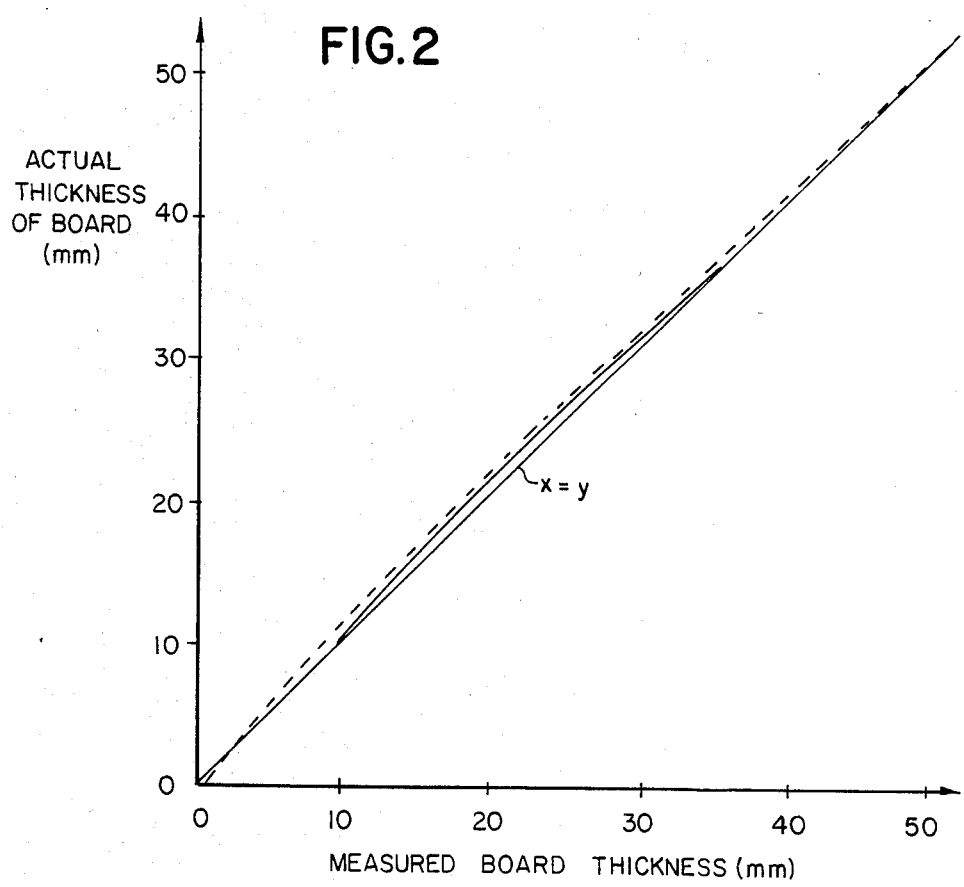

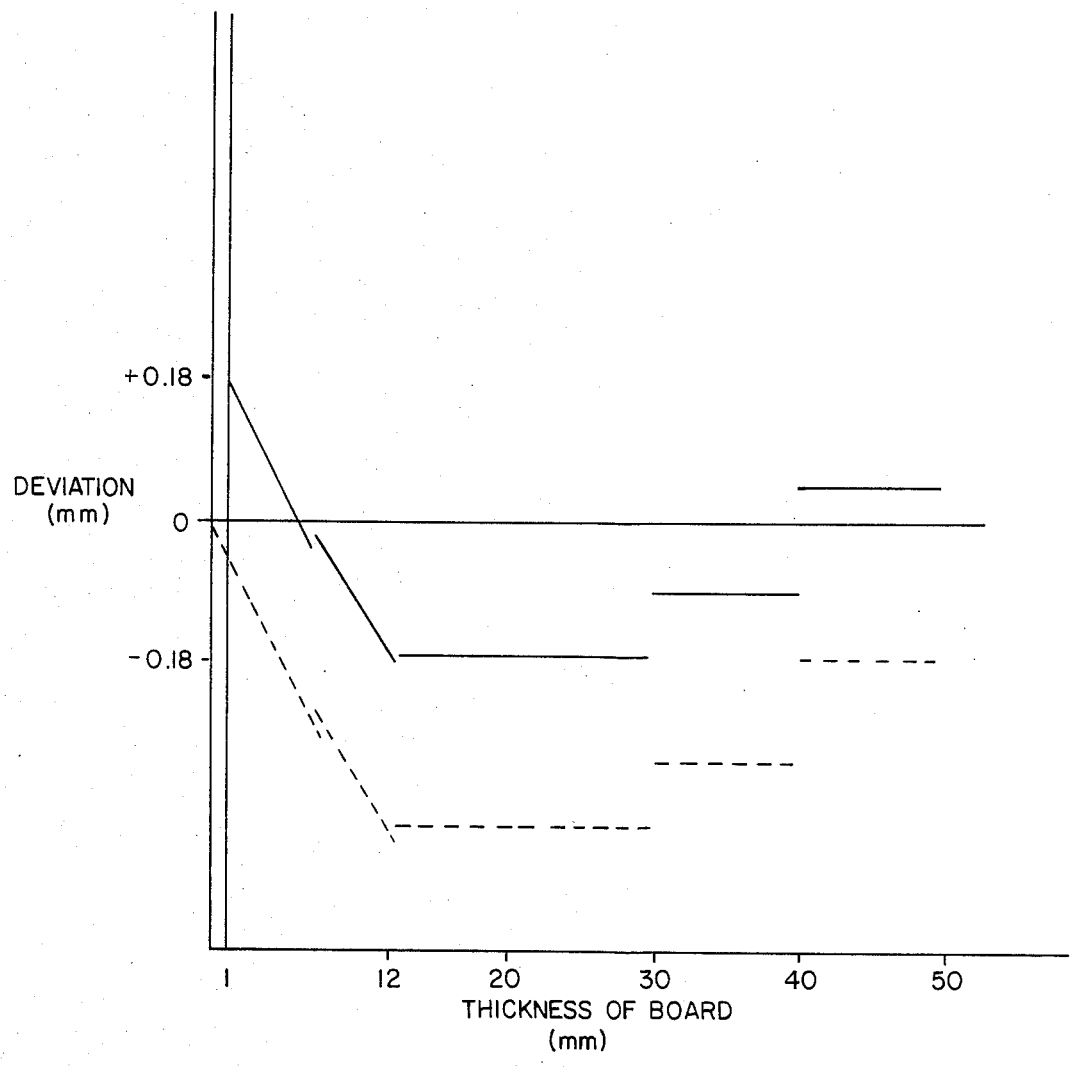

ULTRASONIC THICKNESS GAUGE

BACKGROUND OF THE INVENTION

1. Field of the Invention

The present invention relates to an ultrasonic thickness gauge, and particularly to an ultrasonic thickness gauge designed to improve the measurement accuracy through correcting the measurement deviation caused due to the structure of the split-type probe.

2. Prior Art

Ultrasonic thickness gauges are measuring apparatuses which are capable of readily measuring the thickness of boards, pipes, tubes, etc. made of metals, such as steel, copper, aluminium, or non-metallic materials, such as plastics, glasses, ceramics, regardless of their type. Such measuring devices are also capable of easily measuring even the center portion of material boards which cannot be measured by micrometers. Thus, they are used widely in various industrial fields.

The methods used for measuring the thickness by means of ultrasonic thickness gauges are two types: the so-called resonance method and the pulse method. Of these two types of methods, the pulse method is based upon the fact that, in boards made of the same material, the round trip time for the ultrasonic pulse is proportional to the thickness of the board. In actual measurement, a probe is brought into contact with a material board. Then, the time taken from the transmission of the ultrasonic wave to the reception of the reflected wave reflecting from the opposite surface of the board is obtained. Thereafter, from the time obtained as mentioned above and also from the sonic velocity in the board, the thickness of the board is calculated, and the result is shown by a digital display, etc. The pulse method is now used extensively because of the high measurement precision provided by it as well as simplicity and convenience in application.

To further assist in understanding this invention, a description will be given on the prior art with reference to the drawings.

FIG. 1 shows a schematic structure of a split-type probe, which is one of the probes used for ultrasonic thickness gauges using the above-described pulse method. This split-type probe 1 has a transmitting oscillator (vibrator) 4 and a receiving oscillator 5 which are equipped with shoes 2 and 3 split to the left and right sides. The probe 1 also has a shielding plate 6 disposed between the transmitting oscillator 4 with the shoe 2 and the receiving oscillator 5 with the shoe 3. The shielding plate 6 is pressed into contact with a board 8 that is a material to be measured, with a compression spring 7, in order to prevent the transmission of the vibration along the surface of the board 8, from the transmitting side to the receiving side. With such a structure provided, it is possible to measure the thickness of a particularly thin board.

However, in the use of this split-type probe 1, when the thickness of the board 8 varies, the geometrical route of the pulse varies non-analogously as represented by I, II and III in FIG. 1. Therefore, the proportional relationship between the thickness of the board and the route length of the pulse is not perfect (constant). Consequently, the relation between the measurement value and the actual thickness of the board generally becomes such as that shown by the solid lines in FIG. 2 (for the case where the adjustment is made so that the measurement value is equal to the actual thickness of the board when it is 6 mm). FIG. 3 shows the approximations of the experimental values for the errors in the foregoing case. As seen in FIG. 3, up to 1 mm–7 mm, 7 mm–12 mm (the pitch varies with 7 mm as the dividing point) in the thickness of the board, the error varies nearly linearly, while in the respective sizes of 12 mm–30 mm, 30 mm–40 mm, and after 40 mm, the errors are nearly constant. In the use of split-type probes, usually error curves with the tendencies as described above are always shown and the errors in such cases reach 0.18 mm at a maximum in the embodiment provided by the prior art shown here. In other words, the above-described conventional type thickness gauges have been causing measurement errors which cannot be tolerated as negligible in view of recent demands for precision measurement requiring accuracy even up to 1/10–1/100 mm.

On the other hand, in order to carry out correction for the foregoing errors, it is possible to use a method wherein a table obtained based on the correction curves for the relations shown in FIGS. 2 and 3 is stored in a memory in advance, and by using the measurement values as addresses, the actual values are read out as data from the memory. However, this method requires complicated circuit structure, resulting in a large size device as well as increasing the weight of it. It also has the additional disadvantage of necessitating the use of a substantial amount of time and labor for preparation of the program, etc. Thus, this method is not practical for actual use.

Consequently, in many cases the measurement errors, which vary depending on the thickness of the board as mentioned above, have been left as they are without getting any effective correction. Thus, although they do not cause much problem for measurements which require only rough accuracy, they give greater errors for the measurements carried out for accuracies of 1/10–1/100 mm requested by the user, thereby inviting less reliability for values of lower digits. Accordingly, the problems due to the infeasibility of performing precision measurement have not been cleared.

SUMMARY OF THE INVENTION

It is a general object of the present invention, therefore, to obviate the afore-described disadvantages accompanying the prior art.

The primary object of the invention is to provide an ultrasonic thickness gauge with improved measurement accuracy, through correcting the measurement errors caused by a split-type probe.

It is also another object of this invention to provide an ultrasonic thickness gauge that is small in size, light in weight, and simple in structure.

According to this invention, a small size and light weight ultrasonic thickness gauge with a simple structure is obtained. This ultrasonic thickness gauge is capable of measuring the thickness with accuracies of 1/10–1/100 mm, through correcting the measurement errors caused by a split-type probe. Therefore, this thickness gauge can sufficiently meet the recent requirement for highly advanced manufacturing control.

The above-mentioned objects of this invention are intended to be achieved through, in addition to other measures, a counter, a zero point controlling circuit, and a coefficient selecting circuit. The counter is used for counting the clock pulses applied to a board during each previous measurement conducted for the material subjected to the measurement. This previous measurement is carried out by using a zero point that is set in advance. The foregoing counting of the clock pulses by the counter is performed within a specified range. The zero point controlling circuit serves to vary the zero point of a zero point calibration circuit in proportion to the counted value obtained by the counter. The coefficient selecting circuit functions to perform a stepwise shift of the proportionality coefficient of the zero point controlling circuit in accordance with the board thickness that was measured previously.

Hereunder, a brief description will be given of the method for correction applied in this invention. The time interval between transmission and reception in the pulse method is equal to the sum of the passage time in the material board 8 and the passage times in the shoes 2 and 3 in FIG. 1. Accordingly, it has been the practice used for ultrasonic thickness gauges that a zero point calibration circuit, which is used for delaying the zero point by a specified delay time (the duration for the passage of ultrasonic pulse through the inside of the shoes 2 and 3) from the transmission triggering timing, is provided in each of those ultrasonic thickness gauges. The time interval from the zero point thus calibrated to the point of reception has been used for calculating the thickness of the board. In such a case, to advance the zero point of the zero point calibration circuit in terms of time means that a positive correction is done, while to put the zero point back in time is equivalent to performing a negative correction. Therefore, in this invention, the thickness of a material board for measuring is measured by using the zero point fixed at a predetermined position. Thereafter, by shifting the foregoing zero point of the zero point calibration circuit by a portion equivalent to an augmenter (amount of correction, correction value) in accordance with the board thickness obtained as mentioned above, the augmenter for the measurement to be performed next (the formal measurement) is set.

BRIEF DESCRIPTION OF THE DRAWINGS

The above-mentioned features and objects of the present invention will become more apparent from the following description taken in conjunction with the following drawings in which like reference numerals denote like elements and in which:

FIG. 1 is a schematic diagram showing the measuring state when using a split-type probe;

FIG. 2 is a graphical representation showing the relation between the values obtained by the measurement of the thickness of the board using the split-type probe and the actual values;

FIG. 3 is a graphical representation showing the relation between the errors and the measurement values shown in FIG. 2;

DETAILED DESCRIPTION OF THE INVENTION

Hereunder, the description of the first embodiment of this invention will be given with reference to FIGS. 3–8.

First, an additional description will be given of the correction performed by the first embodiment of this invention. In this embodiment, besides employing the basic method for the correction, the range for correction is divided into 5 divisions: 0–7 mm, 7 mm–12 mm, 12 mm–30 mm, 30 mm–40 mm and above 40 mm, in accordance with the board thickness, depending on which pitch of the deviation curve or the augmentor, mentioned previously, vary. Then, correction is made by applying a different pitch of the deviation curve or the augmenter for each of those divisions.

Also, in FIG. 3 referred to previously, for a board thickness of 1–6 mm and 40 mm or above, a negative correction is necessary due to positive error, while a positive correction is required for a board thickness between 6 mm and 40 mm because of a negative error in this range. However, the adjustment is made so that the positive correction can be made all the time by preliminarily setting that the error becomes zero when the thickness of the board is 0 mm as shown by the dotted lines in FIGS. 2 and 3. Then, for the divisions of 0 mm–7 mm and 7 mm–12 mm, the respective specified positive corrections are made in proportion to the board thickness, while for the divisions after 12 mm, the corrections are made by applying the respective constant correction values.

Also, in order to carry out the measurement by counting the clock pulses from an asynchronous oscillator, an averaging system is used for effecting the adjustment of the augmenter in the initial state (16 times of measurement) of this measurement operation. In this case, the averaging system used is a method to obtain the board thickness by integrating the measurement values obtained from a plural number of measurements (160 times in this embodiment) in order to eliminate (balance out) the dispersion of the measurement values. The reason for using the plural number of measurements in the augmenter adjusting period is to avoid (level off) the dispersion of the measurement values during this period.

Figure 4:
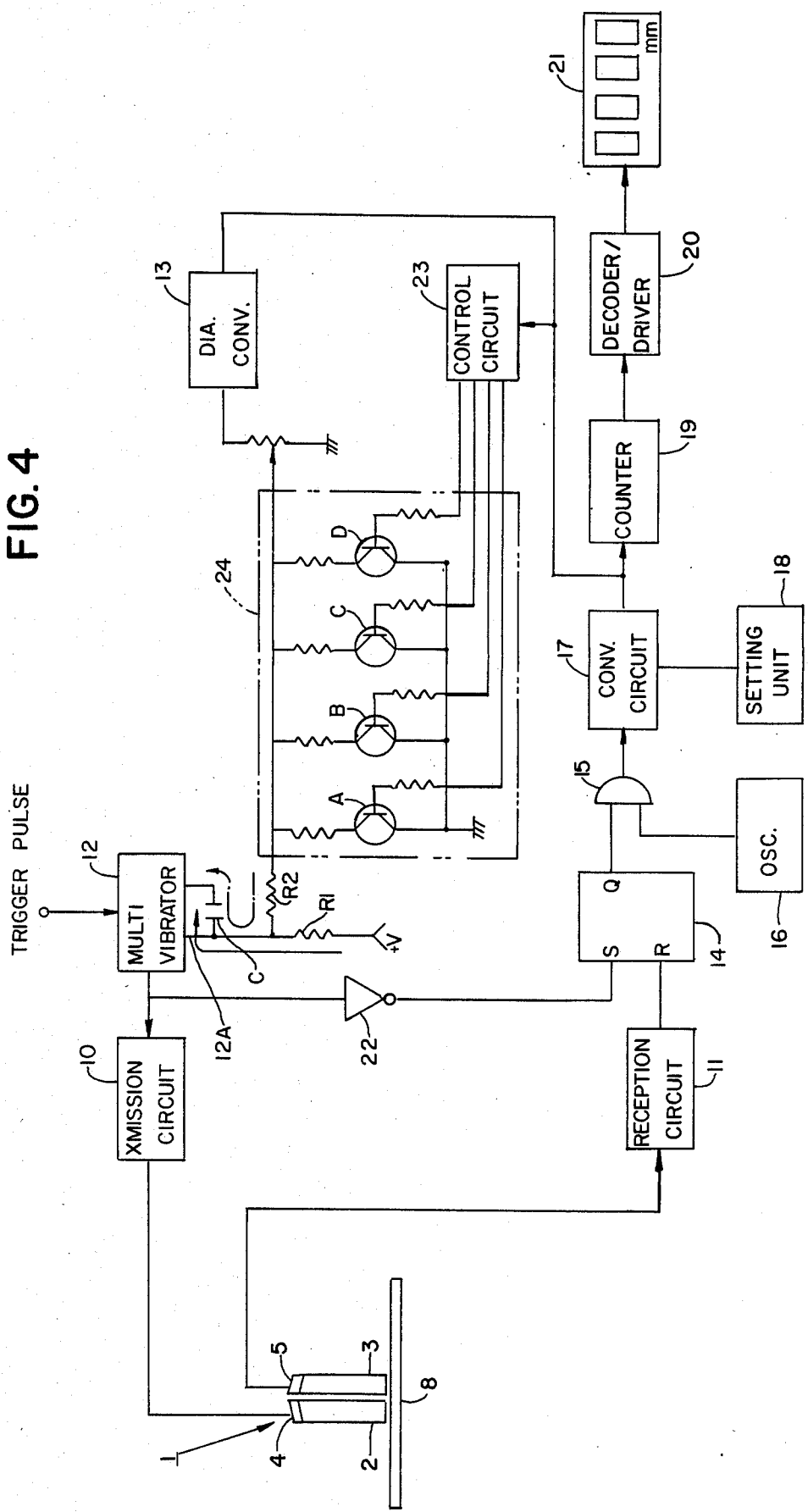
FIG. 4 is a block diagram showing an ultrasonic thickness gauge referred to in the first embodiment of this invention.
Figure 5:
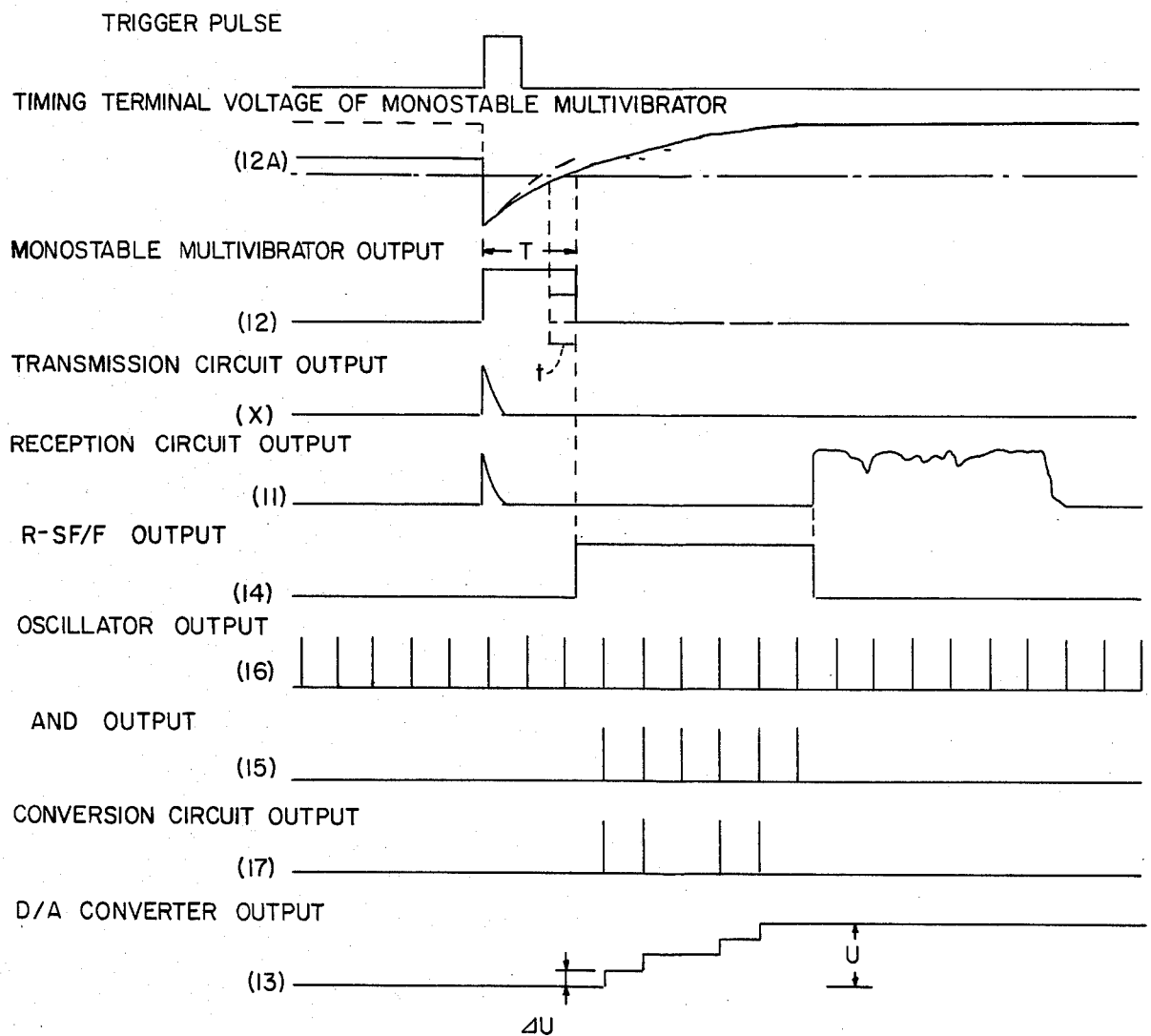
FIG. 5 is a timing chart for the first embodiment.

FIG. 4 is a block diagram of the ultrasonic thickness gauge using a split-type probe in accordance with the present invention, and FIG. 5 is a timing chart. In FIG. 4, the split-type probe 1 is pressed downward and brought into contact tightly with the material board 8 to be measured, from above through an oil film, etc. inserted in between. In the split-type probe 1, a transmission circuit 10 is connected to a transmitting oscillator 4, while a reception circuit 11 is connected to a recepting oscillator 5. To the foregoing transmission circuit 10, a monostable multivibrator 12, as an example of the zero point calibration circuit, is connected. It is designed such that into this monostable multivibrator 12, a start trigger is inputted each time from an outside control circuit (not shown in the drawings) at the time to start the measurement. When the trigger pulse for starting the action is inputted, the inside state of the monostable multivibrator 12 is inverted immediately, and the output that was set previously as a "low" becomes a "high". This "high" state continues for the time T that is determined by the power (source) voltage +V, that is applied to one end of each of the circuit constants C, $R_1$, $R_2$, and $R_1$ of the CR circuit for timing, as well as by the output voltage U of a D/A converter 13, that is applied to one end of $R_2$. Thereafter, the foregoing inside state returns to be a "low" again. The output voltage U of the D/A converter 13 mentioned above is set to increase step by step from U=O to U=Umax, and it is designed such that with an increase in U of 1 step ($=\Delta U$) each time, the previously described delay time T is shortened by $\Delta t$. Also, it is constructed such that the foregoing output U of the D/A converter 13, that is applied to the resistance $R_2$, can be varied by a control circuit 23 and a coefficient selecting circuit 24 which will be described later.

The previously described transmission circuit 10 transmits a single pulse by being activated by the rising transition from "low" to "high" of the monostable multivibrator 12. By means of this single pulse, the transmitting oscillator 4 performs the electricity-sound conversion and causes an ultrasonic pulse to be transmitted. This ultrasonic pulse is received by the receiving oscillator 5 by way of the shoe 2, the material board 8, and the shoe 3. After being converted from sound to electricity by the receiving oscillator 5, the ultrasonic pulse is sent to the reception circuit 11.

This reception circuit 11 has a signal amplifying function as well as an automatic gain controlling function (AGC). Therefore, the amplitude of the received waveform is controlled to be constant regardless of the thickness of the board. The output side of this reception circuit 11 is connected to the R (reset) terminal of a R-S flip-flop (hereafter referred to as "R-S F/F") 14. On the other hand, the S (set) terminal of this R-S F/F 14 is connected to the output side of the monostable multivibrator 12 through an inversion circuit 22.

This R-S F/F 14 becomes "set" in state when the output of the monostable multivibrator 12 is shifted from "high" to "low", and causes the Q terminal output to be "high". On the other hand, when the received signal is inputted to this R-S F/F 14 from the reception circuit 11, the R-S F/F 14 becomes "reset" and causes the Q terminal output to become a "low". With such a structure provided, by using the drop-off timing from "high" to "low" of the monostable multivibrator 12 as the zero point, the R-S F/F 14 functions to output a square wave wherein the time from the foregoing zero point to the ultrasonic pulse receiving timing is represented as the pulse width relevant to the board thickness.

The Q terminal of the R-S F/F 14 is connected to one of the input terminals of AND circuit 15. To the other input terminal of this AND circuit 15, an asynchronous oscillator 16 is connected. Only for the time wherein the above-described square waves are inputted from the R-S F/F 14 to this AND circuit 15, the appropriate gate is opened and the clock pulses from the aforesaid oscillator 16 are sent out to a conversion circuit 17 that is connected to the output side of the AND circuit 15.

In this case, when the sonic velocity in a material varies depending on the quality of the material to be measured, the pulse width of the square wave relating to the board thickness, which is outputted from the above-mentioned R-S F/F 14, is varied even if the board thickness is the same. Accordingly, the foregoing conversion circuit 17 is provided in order to function to output the same number of pulses when the board thickness is the same, regardless of the difference of the quality of material. This function is achieved through thinning out the pulses, at a given ratio, from the pulse train (group) outputted through the AND circuit 15, according to the sonic velocity set by a sonic velocity setting unit 18, such as a DIP switch group. In other words, when the sonic velocity is high, the ratio for thinning performed by the conversion circuit 17 is reduced because the board thickness is bound to be estimated thinner in such a case; while, on the contrary, when the sonic velocity is low, the ratio for thinning done by the conversion circuit 17 is increased since the board thickness is estimated thicker in this case.

The output side of the conversion circuit 17 is connected to an integrating counter 19 functioning as the board thickness measuring circuit. This integrating counter 19 is structured not only to be able to count the clock pulses sent out from the foregoing conversion circuit 17, but also to be able to perform the cumulative counting for all of the pulses involved in the 160 measurements conducted by using the averaging system.

On the other hand, the clock pulse output of the previously mentioned conversion circuit 17 is inputted also to the D/A converter 13. This D/A converter 13 is designed as follows. That is, for example, the A/D converter 13 includes a counter unit (not shown in the drawings) for counting clock pulses outputted from the conversion circuit 17, and a ladder-type circuit network (not shown in the drawings) connected to the bit terminals of respective digits of this counter unit. Every time the clock pulse is inputted from outside, the count value increases by 1, and the voltage that is increased by 1 step ($=\Delta U$) each time in proportion to the foregoing count value is outputted from the ladder-type circuit.

The D/A converter 13 adds up all of the clock pulses sent from the conversion circuit 17 during the measurements from the first to the 16th time, out of the measurements to be repeated 160 times, or during the measurements until the count value of the count unit becomes "n" when that count value reaches a specified value "n" before the measurement proceeds up to the 16th time. While performing the integration as described above, the D/A converter 13 outputs an analog voltage corresponding to the count value. When the 16th measurement is completed, or when the count value becomes "n" before the 16th measurement, the aforesaid counter unit is held up, and thereafter, the output voltage is fixed to be U(16) or Un, in value.

In this case, the reason for stopping the integration at the point when the count value of the counter unit reaches a specified value "n" is to keep the augmenters constant, respectively for the board thicknesses of the respective divisions of 12 mm–30 mm, 30 mm–40 mm, and above 40 mm, as shown in FIG. 3. The value of "n" mentioned above is preliminarily set.

The output voltage U of this D/A converter 13 is applied to one end of $R_2$ constituting the CR circuit for timing, which is provided for the previously mentioned monostable multivibrator 12, and depending on the level of this voltage U, the charging current for condenser C varies in amperage. Since the U is stepped up every time the measurement is completed, the delay time T covering the interval from the discharge of the condenser C by being activated by the trigger pulse to the point where the voltage of the left side terminal 12A reaches the specified threshold value by being charged is shortened with time of repeated measurement. The shortening value $\tau$ (correction value K) of this delay time is adjusted so that it varies in proportion to the U, by using the point when the voltage U of the D/A converter 13 is 0 as the datum. When the measurement of one time is completed, the zero point of the zero point calibration circuit is advanced in terms of time. Therefore, in the next measurement, the pulse width of the square wave outputted from the R-S F/F 14 becomes longer by a portion equivalent to the foregoing advancement of the zero point in terms of time. As a result, the correction is made in a direction to thicken the board thickness (positive correction).

Furthermore, as was mentioned above, the output voltage U of the D/A converter 13, that is applied to the resistor $R_2$, is designed to be varied by a control circuit 23 having the counter unit, comparing unit, etc. as well as by a coefficient selecting circuit 24 having transistors A, B, C, D and some resistances.

A detailed description will be as follows. First, the foregoing control circuit 23 counts the clock pulses outputted from the previously mentioned conversion circuit 17, and when the count value reaches the specified values "m", "n", "o", "p", feeds the base current in sequence to the transistors A, B, C, D, which respectively correspond to those count values. These values of "m", "n", "o", "p" respectively show the count values to be subjected to integration when the board thickness is 7 mm, 12 mm, 30 mm and 40 mm, respectively. The values "m", "n", "o", and "p" are set in advance. In other words, when the count values of the counter unit of the foregoing control circuit 23 become "m", "n", "o", and "p", respective transistors A, B, C, and D are channelled respectively, and the output voltage of the D/A converter 13, which is applied to the resistor $R_2$, is varied step by step. Through the operation as described above, the proportionality coefficient of the shortening value $\tau$ (correction value K) that varies in proportion to the output voltage of the D/A converter 13 is varied stepwise, and thus the correction value (augmenter) is adjusted.

Hereunder, a description will be given with reference to an actual embodiment. For example, as "m" is set that, when the board thickness is 4 mm, the count value obtained by the counter unit of the control circuit 23 does not reach "m" even if the measurement is performed 16 times, the base current is not fed to any of the transistors A, B, C, and D. However, when the board thickness is 8.5 mm, the count value becomes "m" before the measurement is performed by the 16th time. Consequently, when the count value reaches "m", the base current is fed to the transistor A, and the voltage applied to the resistor $R_2$ is stepped down. By the operation performed as mentioned above, the proportionality coefficient of the correction curve is varied step by step, thereby carrying out the adjustment of the correction value (augmenter). Also, when the board thickness is 20 mm, the count value becomes above "m" as well as "n" through integration. Therefore, when the count value "m" is obtained, the base current is fed to the transistor A as was mentioned previously, and when the count value becomes "n", the base current is supplied also to the transistor B. Furthermore, when the count value becomes "n", the output voltage of the D/A converter 13 becomes a constant. As the result, the correction values after this point become constant in the respective divisions. When the board thickness is 36 mm, the count value is integrated to above "m", "n", "o". Accordingly, when "o" is obtained, the transistor C is also supplied with current. Also, when the board thickness is 42 mm, as the count value exceeds "p", the transistor D is supplied with current when "p" is reached (at this time, all transistors are opened to be connected to the current). In this way, the correction value is adjusted in stepwise manner in an effort to improve the approximation precision.

Through taking the foregoing procedures, by the time when the measurement is completed at the 16th time, a constant correction value K corresponding to the board thickness is obtained. Thereafter, the measurement is repeated up to 160th times.

Figure 6:
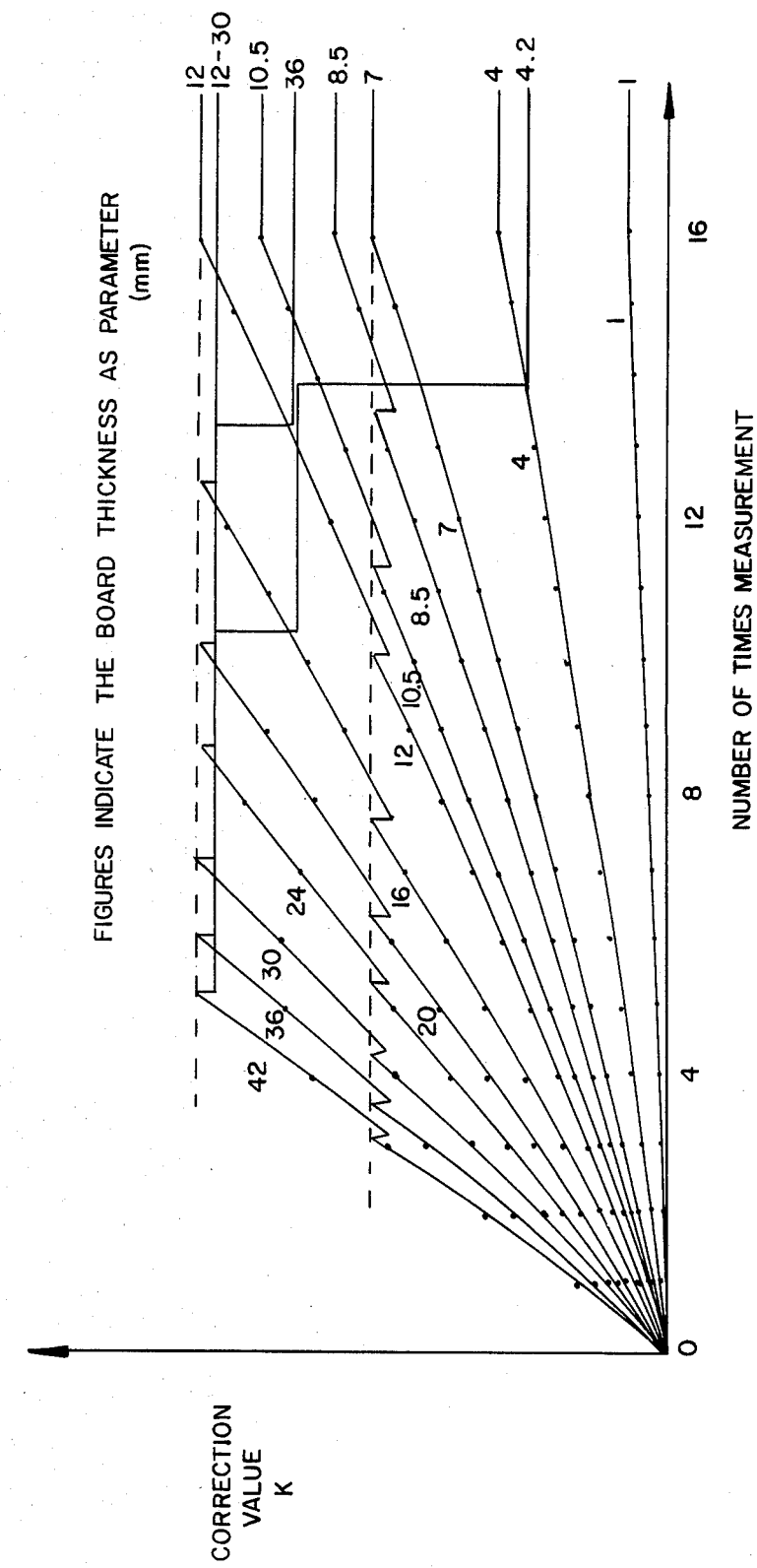
FIG. 6 is a diagrammatic view showing the action of the ultrasonic thickness gauge of the first embodiment shown in FIG. 4.
Figure 7:
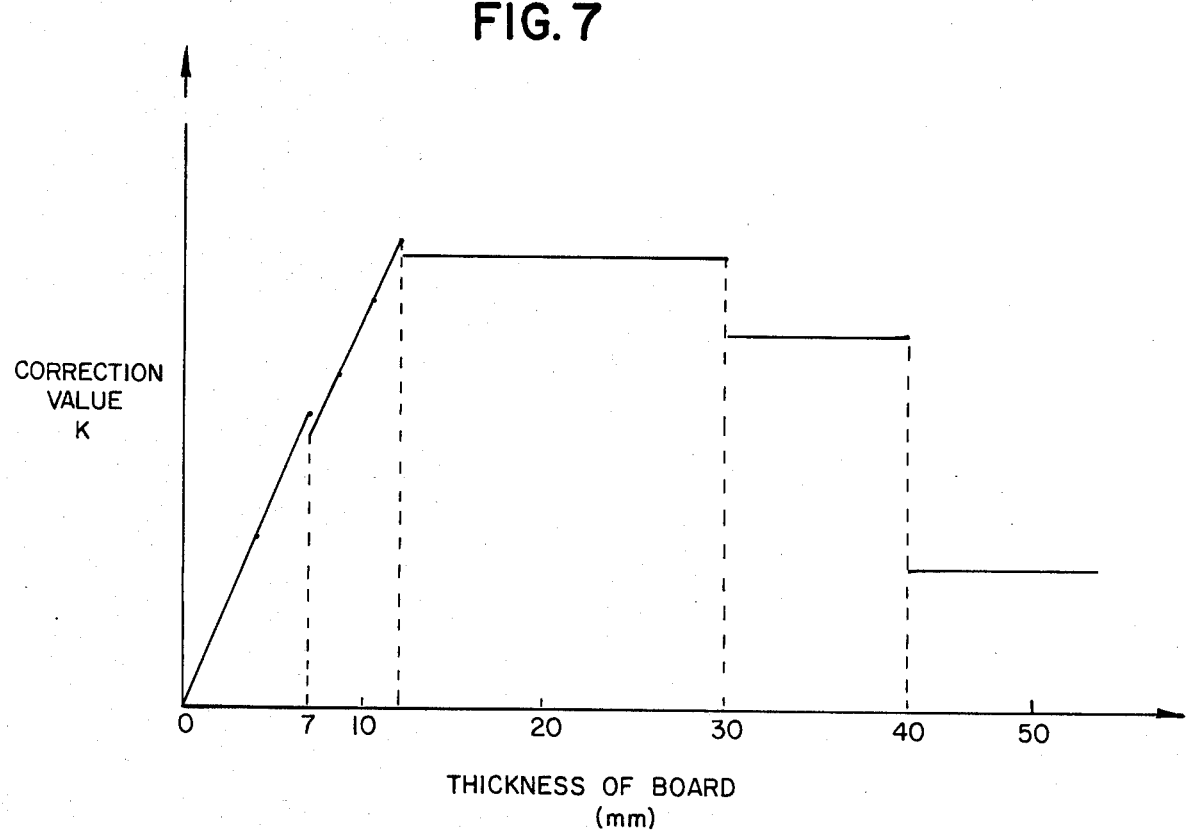
FIG. 7 is a graphic representation showing the relation between the board thickness and the augmenter in the ultrasonic thickness gauge of the first embodiment shown in FIG. 4.

FIG. 6 shows the aspects of the variation of the correction value K by using the thickness of the board upon completion of each measurement from the first time to the 16th time as the parameter. FIG. 7 shows the relation between the board thickness and the correction value K at the time of completion of the 16th measurement.

What is indicated is that, by using the structure as described above and by setting the CR constant for timing of the monostable multivibrator 12, the impressed voltage $+V$ onto the resistor $R_1$, the step voltage U of the A/D converter 13, the respective transistors of the coefficient selecting circuit 24, and the respective resistances, at specified values, respectively, the absolute values of the correction curves in FIG. 7 and the absolute values of the deviation curves shown by the dotted lines in FIG. 3 can be matched to each other and also mutually cancelled.

On the other hand, in the measurement operation at each time, the clock pulses outputted from the conversion circuit 17 are all added up in the integrating counter 19. To the output side of this integrating counter 19, a decimal four digit display unit 21 is connected through a decoder/driver 20. When the measurement of the 160th time is completed, by means of the operation of the control circuit (not shown in the drawing) of the apparatus, the board thickness corresponding to the cumulative value of the integrating counter 19 is displayed by using 1/100 mm as the unit.

Next, a description will be given of the overall operation of the foregoing embodiment.

First, when the apparatus is actuated after setting the sonic velocity corresponding to the quality of the material board 18 by a sonic velocity setting unit 18, by means of the operation of the control circuit of the apparatus, the R-S F/F 14 is reset; and at the same time, the integrating counter 19 and the counter unit of the D/A converter 13 are cleared. Consequently, the output of the D/A converter 13 becomes zero. In this state, the control circuit (not shown in the drawings, but consisting of conventional circuitry) outputs the first trigger pulse to the monostable multivibrator 12 (see FIG. 5). When the trigger pulse is inputted, this monostable multivibrator 12 inverts its output, and by this rising transition, the transmission circuit 10 send out a single pulse and causes the transmitting oscillator 4 to transmit the ultrasonic pulse. Furthermore, when the initial delay time $T_0$ has lapsed and the monostable multivibrator 12 is inverted, the R-S F/F 14 is set by using this timing as zero point. The foregoing ultrasonic pulse is reflected at the end face of the material board 8 to be measured, and then received by the receiving oscillator 5. Thereafter, the ultrasonic pulse is sent to the R-S F/F 14 through the reception circuit 11 and causes the R-S F/F 14 to be reset.

While this R-S F/F 14 is in the set state, the clock pulses are outputted from the AND circuit 15. These clock pulses are thinned out in the conversion circuit 17 in accordance with the sonic velocity. Thereafter, the clock pulses are counted by the integrating circuit 19, and also counted by the D/A converter 13. Then, the analog voltage U (1) corresponding to the foregoing count value is outputted. Being affected by the shift in output of the D/A converter 13, the delay time T of the monostable multivibrator 12 is shortened, by the portion of $\tau(1)$, from $T_0$. This means that in the next measurement, the correction is made with a correction value (K1) that is proportional to $\tau(1)$.

Next, the control circuit of the apparatus outputs the second trigger pulse to the monostable multivibrator 12. By receiving this trigger pulse, the monostable multivibrator 12 becomes inverted, and in the same manner as mentioned previously, the ultrasonic pulse takes its path through the transmission circuit 10, the transmitting oscillator 4, the material board 8, the receiving oscillator 5, and the reception circuit 11. For the second measurement, the R-S F/F 14 is set to be ahead of the setting for the first measurement, by the portion equivalent to $\tau(1)$, as the result of the procedure taken in the first measurement. Accordingly, the time to be taken until R-S F/F 14 is reset by the output from the reception circuit 11 becomes longer. In consequence, from the conversion circuit 17, the clock pulses in number which are increased by a portion equivalent to the correction value (K)1 are outputted. These clock pulses are counted by being added up to the count value obtained in the first measurement, by the integrating counter 19. The clock pulses are counted through integration also by the D/A converter 13. As the result, the output of the D/A converter 13 becomes U(2) which is higher than twice of U(1), and also the delay time T becomes shorter than $T_0$ by $\tau(2)$. Thus, for the third measurement, a correction value K(2) proportional to $\tau(2)$ is set.

Thereafter, the apparatus works to repeat the same operation as described above. However, as was described previously, during the operation, when the count value of the counter unit of the control circuit 23 exceeds each of the predetermined values "m", "n", "o", and "p", the control circuit 23 feeds current to the bases of the transistors A, B, C, D of the coefficient selecting circuit 24 in order to vary the output voltage from the D/A converter 13. In this way, the proportionality coefficient is varied in a stepwise manner each time when necessary.

With this operation, when 16 times of the adjustments are completed and the correction value adjusting period comes to its end, the correction value (16) relevant to the board thickness can be obtained (see FIG. 6). The absolute values of these correction values (16) correspond to the absolute values of the errors represented by the dotted lines in FIG. 3.

When the period for adjusting the correction value (augmenter) is ended in this manner, the same measurement operation is repeated up to the 160th time, when the specified correction values fixed to be those as shown by the dotted lines in FIG. 3. The clock pulses relating to the measurement of the board thickness for each time starting from the first measurement are integrated in sequence including the corrections (augmenters), at the integrating counter 19.

At the completion of the 160th measurement the cumulative value at the integrating counter 19 is converted into a BCD code by the decoder/driver 20, and displayed on the display unit 21 as the board thickness after the correction that was obtained by the averaging measurement.

Figure 8:
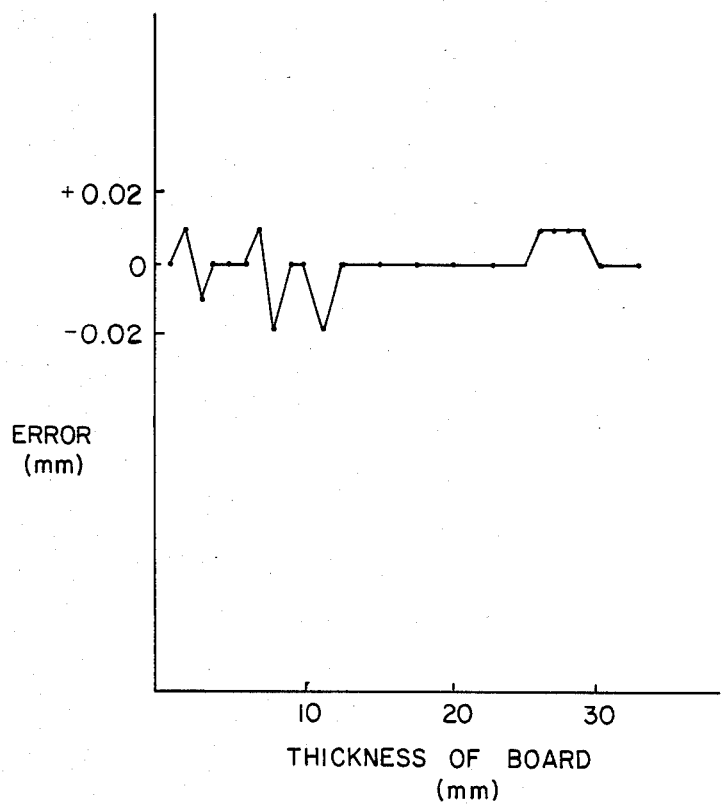
FIG. 8 is a graphic representation showing the errors in the experimental results for the first embodiment.

FIG. 8 shows the errors in the results of experiments conducted by making the correction variable in five stages. The errors are confined within ±0.02 mm, thus indicating a remarkable improvement in accuracy.

According to this embodiment, during the correction value adjusting period, the clock pulses relating to the respective measurement values for the board thickness are cumulated in sequence by the D/A converter, and the voltages corresponding to the cumulated count values are outputted from this D/A converter. Also, the foregoing voltage is varied to the specified value, thereby shortening the delay time of the monostable multivibrator, in performing the correction. Therefore, the correction can be carried out automatically in accordance with the thickness of the board by using an apparatus that is quite simple in structure and very easy to handle.

Besides, of the plural number of measurements, the final correction value is determined during the initial period that is equivalent to 1/10 of the total number of the measurements, and also during the measurement from the first to the 16th time, the correction is carried out in sequence. In this way, the influence of the pressure of the correction value adjusting period on the measurement accuracy is mostly avoided. Accordingly, it becomes possible to fully show the effects of the improvement and stabilization in measurement accuracy brought about by the use of an averaging system. In addition, because the correction value adjusting period is included in the formal measurements performed by using the averaging system, the overall measurement time can be cut down in comparison with the case wherein the foregoing correction value adjusting period is set apart as a preliminary measurement (preparatory measurement) performed prior to the formal measurement.

Hereunder, a description will be given of the second embodiment of this invention.

This second embodiment is a modification of the above-described first embodiment. That is, in the foregoing first embodiment, along the deviation curve that represents an inherent characteristic of the split-type probe, the range to be covered by the measurement is divided into divisions as small as possible (into five divisions in the first embodiment), and the correction is carried out by selecting and preliminarily setting the coefficient of the correction curve for each of those divisions. Such a system is suitable for general purpose use, since the thickness of wide range can be measured with high accuracy by using a single apparatus. However, it may happen sometimes that a specified apparatus capable of measuring the thickness of a given narrow range with high accuracy is required. The second embodiment is provided in order to meet such a requirement.

Also in this second embodiment, a split-type probe which is the same as that in the first embodiment is used.

Figure 9:
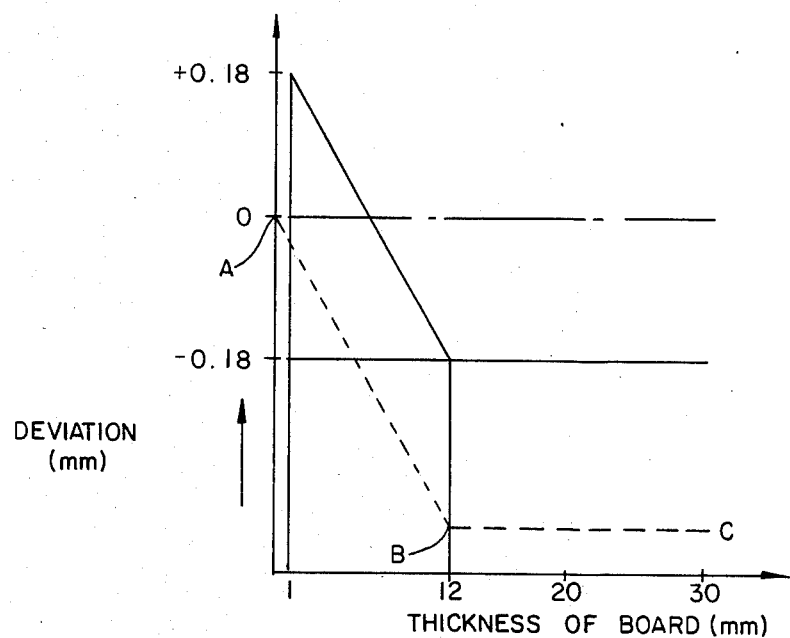
FIG. 9 is a graphic representation showing, in simplified form, the relation between the measurement values and the errors for the range of 1 mm-30 mm in the board thickness in FIG. 2.

The range for measuring the board thickness is set to be 1 mm–30 mm as shown in FIG. 3. Under such arrangement, for example, it can be assumed with almost no problems involved that, as shown in FIG. 9, the error curve is composed of a straight line having a certain pitch from 1 mm to 12 mm in thickness and a straight line with a constant deviation from 12 mm to 30 mm in thickness. Based on this assumption, as to the second embodiment, an ultrasonic thickness gauge, wherein the deviations shown in FIG. 9 are corrected, is described in detail with reference basically to FIGS. 10 through 14.

In this case, the concept of the employment of the averaging system (160 times of measurements) as well as to the correction value adjusting period is the same as that applied in the previously described first embodiment; and as to the correction, the basic method for the above-described correction procedure is used. However, in FIG. 9, for board thickness of 1 mm–6 mm, because of the positive error, a minus correction is necessary; while for a thickness of a board from 6 mm, a positive correction is required due to a negative error. In this embodiment, however, as shown by the dotted lines in FIGS. 2 and 9, it is adjusted such that the positive correction can be made all the time through setting so that the deviation becomes 0 when the thickness of the board is 0 mm. Then, for a board thickness of 0 mm–12 mm, a positive correction is carried out in proportion to the board thickness; while for a board thickness from 12 mm to 30 mm, a constant positive correction is applied.

Figure 10:
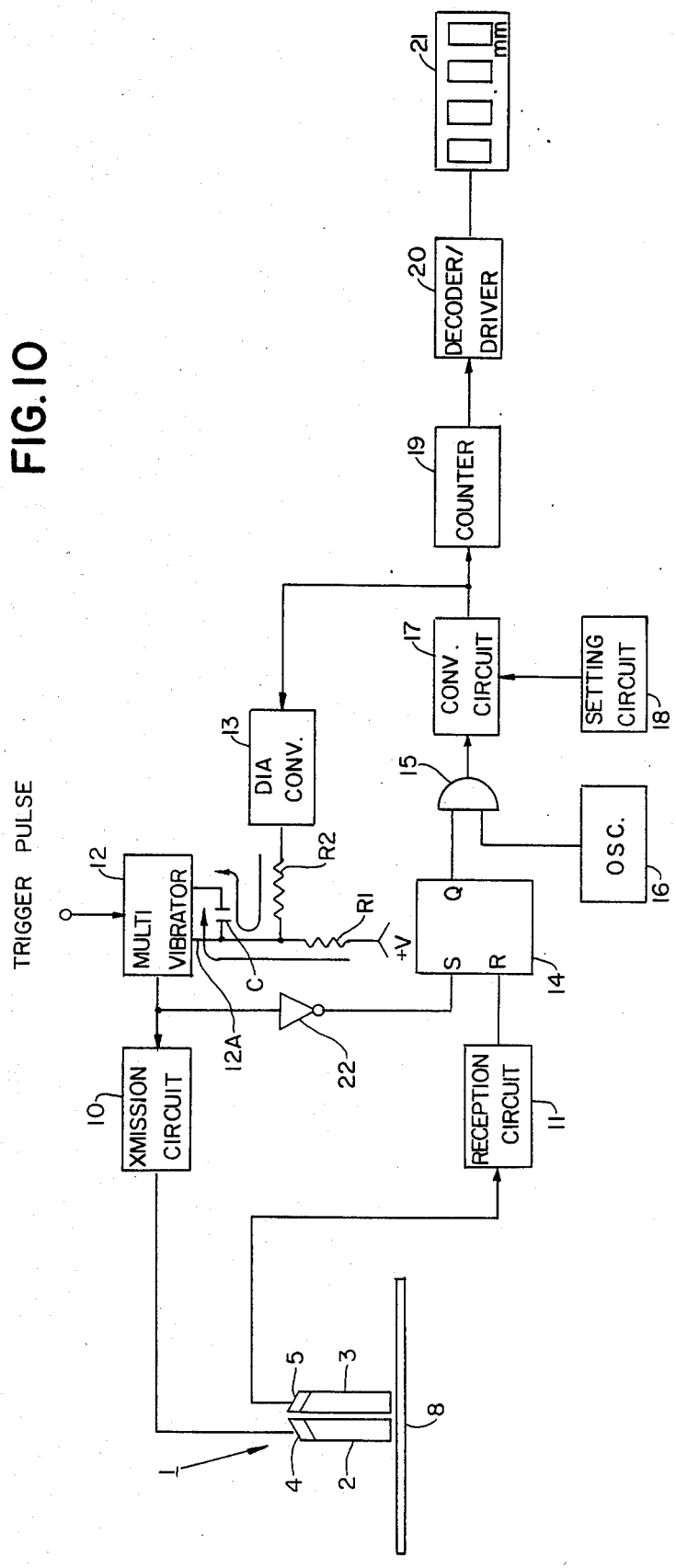
FIG. 10 is a block diagram of a second embodiment of an ultrasonic thickness gauge of this invention.
Figure 11:
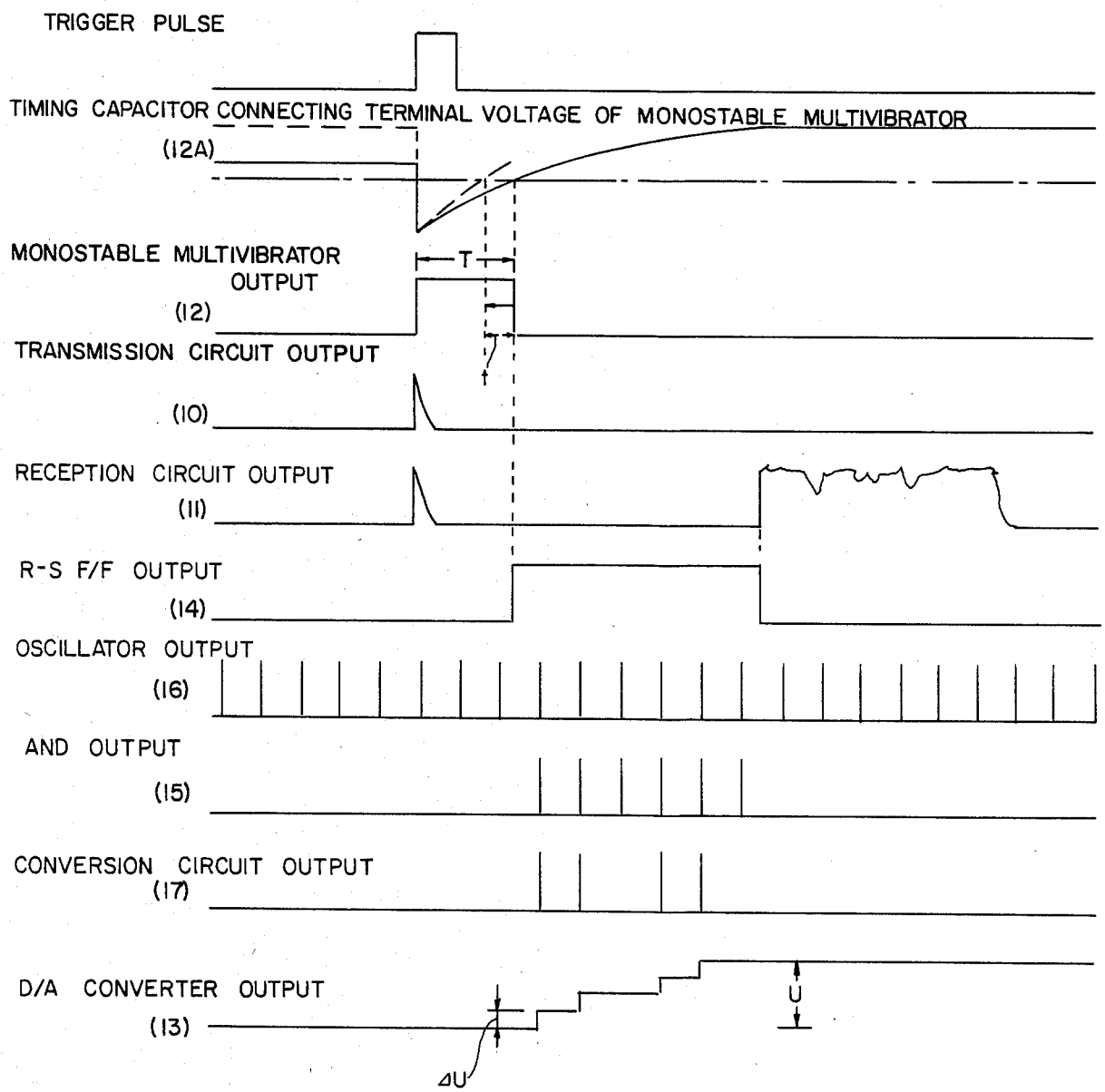
FIG. 11 is a timing chart for the second embodiment.

FIG. 10 is a block diagram of an ultrasonic thickness gauge according to the second embodiment of this invention. FIG. 11 is a timing chart. In these Figures, the compositional elements which are the same as those of the first embodiment are marked with the same reference numerals as in the first embodiment, in order to indicate that also the functions of those elements are the same in the two embodiments. The difference from the first embodiment lies in that the control circuit 23 and the coefficient selecting circuit 24 in FIG. 4 are not included in the structure of FIG. 10. Otherwise, the structure is totally the same as that of the first embodiment. In other words, the output side of the conversion circuit 17 is connected to the counter 19, and at the same time, it is also connected directly to one end of the resistor $R_2$ of the CR circuit for timing of the monostable multivibrator via the D/A converter 13.

Also, the D/A converter 13 adds up all of the clock pulses sent out from the conversion circuit 17, during the measurements from the first to the 16th time out of the measurements repeated 160 times, or during the measurements until the count value of the D/A converter 13 becomes the specified value "n" when the counter value of the counter unit of the D/A converter reaches "n" before the 16th time of the measurements. Meantime, the D/A converter 13 outputs the analog voltage corresponding to the cumulative value. When the 16 times of the measurements are completed, or when the count value reaches "n" before the 16th time of the measurement, the foregoing counter unit is stopped, and thereafter, the output voltage is fixed at U(16) or Un that is the output voltage value at the time of the completion of the 16th measurement or the time when the count value becomes "n" before the measurement proceeds to the 16th time, as described above.

The reason for stopping the integration when the count value of the counter unit becomes a specified value "n" is to keep the correction value constant for the board thickness above 12 mm in FIG. 9. The description on this value n will be given later.

As has been described above, the output voltage U of this D/A converter 13 is applied to one end of the resistor $R_2$ that is a structural member of the CR circuit for timing of the monostable vibrator 12, and depending on the level of this voltage U, the charging current for the condenser C varies in amperage. Because the U is stepped up every time the measurement is completed, the delay time T which is between the point after the discharge from the condenser C caused by being activated by the trigger pulse to the point when the voltage of the left side terminal 12A reaches the specified threshold value by being charged, becomes shortened with the progress of the measurement. The shortening value $\tau$ (correction value K) of this delay time varies in proportion to U, by using the point when the voltage U of the D/A converter 13 is 0 as a datum. When one time of measurement is completed, the zero point of the zero point calibration circuit is advanced in time. Therefore, in the next measurement, the pulse width of the square wave outputted from the R-S F/F 14 is increased by a portion equivalent to the amount of advancement in time. As a result, the correction is bound to be made in a direction to thicken the board thickness (positive direction). This operation is repeated in the same manner in sequence from the first time of the measurement to the 16th time of it, or until the count value of the counter unit of the D/A converter 13 becomes "n" before the 16th time of measurement. The duration for the foregoing repetition of the operations is called the correction value adjusting period. When the 16th measurement is completed, or when the above-described count value becomes "n", the constant correction value K(16) or Kn that is determined depending on the shortening value $\tau(16)$ or $\tau n$ proportional to the output voltage from the D/A converter 13 is obtained. Thereafter, the measurement is repeated until the 160th time.

Figure 12:
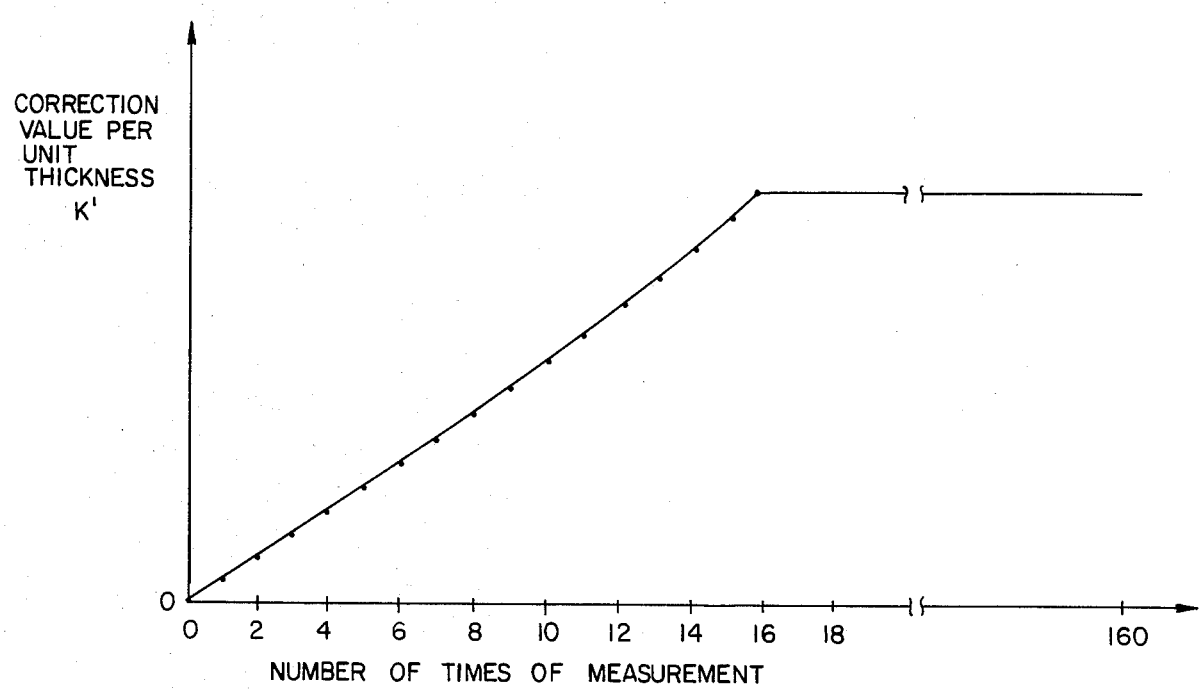
FIG. 12 and FIG. 13 are graphic representations showing the action of the ultrasonic thickness gauge shown in FIG. 10.
Figure 13:
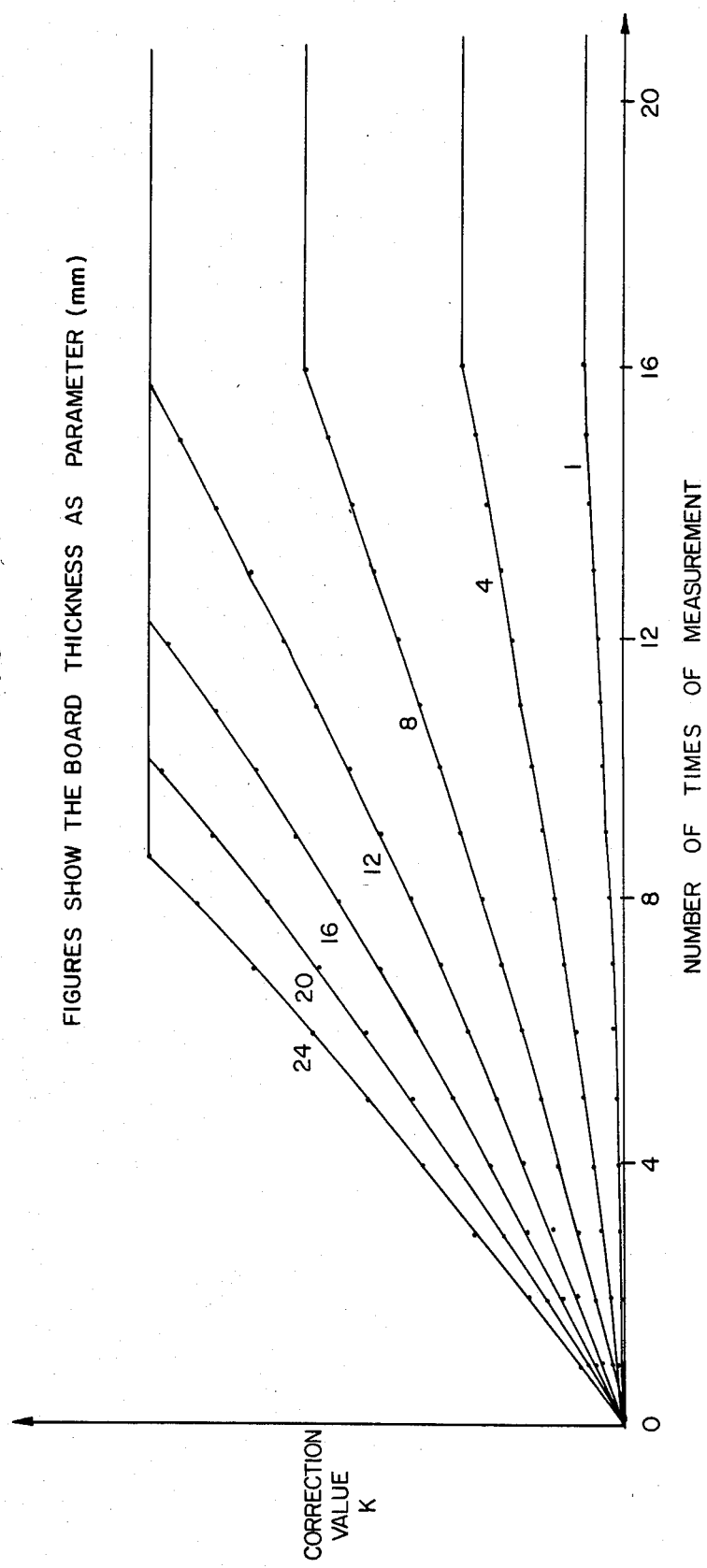
Figure 14:
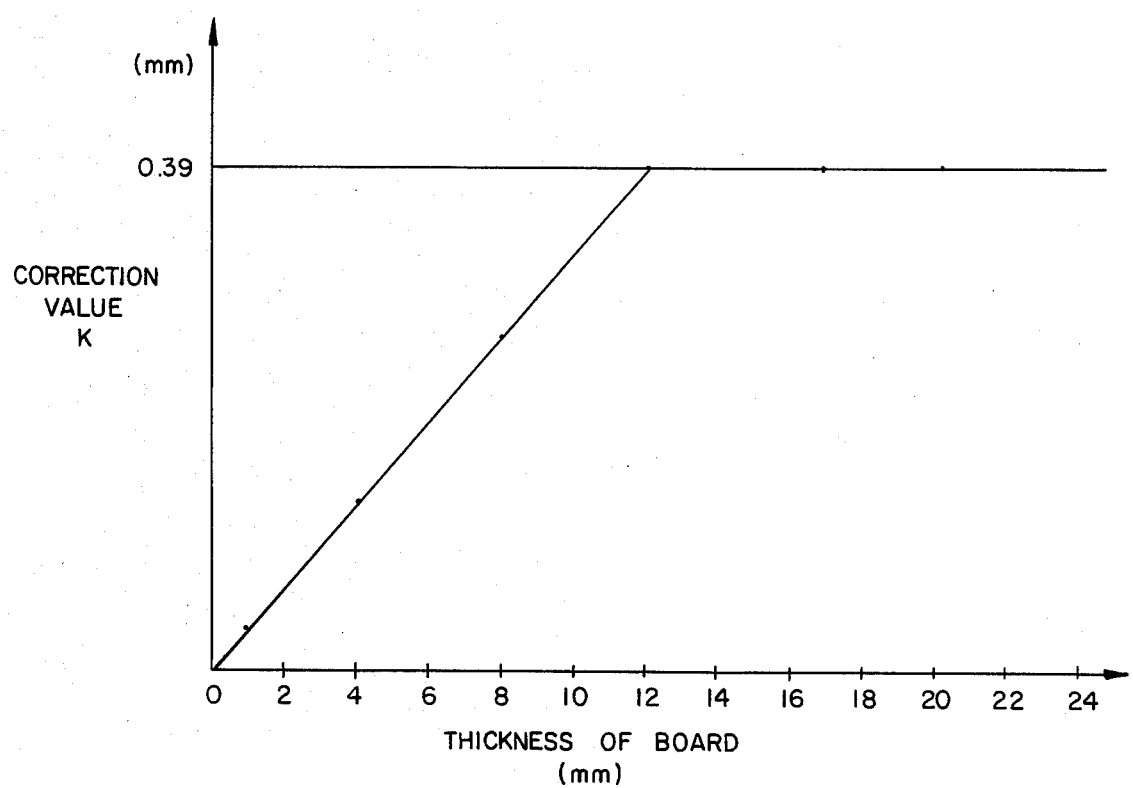
FIG. 14 is a graphic representation showing the relation between the board thickness and the augmenter for the ultrasonic thickness gauge shown in FIG. 10.

FIGS. 12 and 13 show the aspect of the variation of the correction value K' (0–12 mm) for each unit thickness, and that of the variation of the correction value K by using the thickness of the board as a parameter, upon each completion of the measurement from the first time to the 16th time. FIG. 14 shows the relation between the board thickness and the correction value K at the time of completion of the 16th measurement. The constant of the CR circuit for timing of the monostable multivibrator 12, the impressed voltage $+V$ for the resistor $R_1$, and the step voltage $\Delta U$ of the D/A converter 13 are set so that the absolute values of the correction curve in FIG. 14 and the absolute values of the deviation curve in FIG. 9 are mutually matched and also cancelled each other.

Next, a detailed description will be given on the overall operation of the second embodiment.

In this embodiment, for the measurement of the board thickness, the averaging system to integrate the measurement values obtained by the 160 measurements is used. Also, the case wherein the integrated value 100 for the 160 times of the measurement obtained by the integrating counter 19 corresponds to the display of 1.00 mm is used as the standard for proportion. In this case, the count value "n" held at the counter unit of the D/A converter 13 before the 16th measurement is conducted is the integrated value for the 16 measurements from the first to the 16th time for a board thickness of 12.00 mm, and it becomes as shown below:

$$n = 100 \times \frac{16}{160} \times 12 = 120$$

First, the sonic velocity corresponding to the quality of the material board 8 is set by the sonic velocity setting unit 18, and the apparatus is actuated to operate. By the function of the control circuit, the R-S F/F 14 is reset, and at the same time, the integrating counter 19 and the counter unit of the D/A converter 13 are cleared. Consequently, the output of the D/A converter 13 becomes zero. In this state, the control circuit of the apparatus outputs the first trigger pulse to the monostable multivibrator 12 (see FIG. 11). When the trigger pulse is inputted, the output of the monostable multivibrator 12 is inverted. Being activated by this rising transistion, the transmission circuit 10 transmits a single pulse, and causes the transmitting oscillator 4 to send out an ultrasonic pulse. Also, when the initial delay time T is lapsed and the monostable multivibrator 12 is inverted again, by using this timing as zero point, the R-S F/F 14 is set. When the ultrasonic pulse is reflected at the end face of the material board 8 and then received by the receiving oscillator 5, the ultrasonic pulse is sent to the R-S F/F 14 via the reception circuit 11, and causes the R-S F/F 14 to be reset. While this R-S F/F 14 is in the set state, the clock pulses are outputted from the AND circuit 15. After being thinned out at the conversion circuit 17 in accordance with the sonic velocity, these clock pulses are counted by the integrating counter 19, and at the same time, they are counted by the D/A converter 13, and this D/A converter 13 outputs the analog voltage U(1) that corresponds to the foregoing count value. Being affected by the variation of the output of the D/A converter 13, the delay time T of the monostable multivibrator 12 becomes shorter than $T_0$ by $\tau(1)$. In other words, for the next measurement, the correction K(1) is made in portion to $\tau(1)$.

Next, the control circuit of the apparatus outputs a second trigger pulse to the monostable multivibrator 12. Receiving this trigger pulse, the monostable multivibrator 12 is inverted, and in the same manner as described above, the pulse proceeds by taking the route of transmission circuit 10, transmitting oscillator 4, material board 8, receiving oscillator 5, and reception circuit 11. As a result of the first measurement, the R-S F/F 14 is set ahead by $\tau(1)$ in the second measurement in comparison with the first measurement. Therefore, the time to be taken for resetting the R-S F/F 14 by means of the output from the reception circuit 11 becomes longer. As a result, the clock pulses which are increased in number by a portion equivalent to the correction value K(1) are outputted from the conversion circuit 17.

These clock pulses are counted by the integrating counter 19 by being added to the count value for the first measurement, and at the same time, they are counted cumulatively also by the D/A converter 13. Accordingly, the output U(2) of the D/A converter 13 becomes higher than twice U(1), and also the delay time T becomes shorter than $T_0$ by $\tau(2)$. This means that, for the third measurement, the correction is made with the correction value K(2) proportional to $\tau(2)$. By repeating the same operation for the measurements from the first to the 16th time, for the board thickness of 0–12 mm, the correction value K increases in accordance with FIG. 12, and when the correction value adjusting period consisting of the 16 measurements from the first through 16th time is ended, a correction K(16) that varies in proportion to the board thickness is obtained (see FIG. 13). This correction value K corresponds to the dotted line A-B in FIG. 9. Also, when the board thickness is more than 12 mm and the count value of the counter unit of the D/A converter 13 becomes 120 before the 16th measurement is completed, the foregoing counter unit stops. As a result, the output of the D/A converter 13 becomes a constant at $U_{120}$ ($=120 \times \Delta U$). Consequently, the shortening value for the measurements thereafter becomes constant, thereby setting the correction value $K_{120}$, such that it does not vary depending on the board thickness (see FIG. 13). This correction value corresponds to the dotted line B-C in FIG. 9.

When the correction value adjusting period is ended in this manner, the counter unit of the D/A converter 13 is stopped and the correction value is fixed at the specified one shown by the dotted line in FIG. 9. Thereafter, the same measurement operation is repeated until the 160th time. The clock pulses relating to the measurement of the board thickness for each time starting from the first measurement are cumulated in sequence by the integrating counter 19, including the portions (values) for correction.

At the completion of the 160th measurement, the integrated value of the integrating counter 19 is converted to a BCD code by the decoder/driver 20, and displayed on the display unit 21 as the thickness after the correction, obtained by the averaging measurement.

As should be apparent from the foregoing description, this second embodiment is almost the same in its operational effect as the previously described first embodiment, and it is capable of automatically performing the correction in accordance with the thickness of the board, with extremely simple structure and in quite facilitated manner. In addition, improvement as well as stabilization in measurement accuracy by the use of an averaging system can be effected sufficiently. Also, even without using the control circuit 23 and the coefficient selecting circuit 24 which are used in the first embodiment, for the application of the split-type probe causing the error represented by the straight line with a given constant pitch and the straight line with zero pitch (0 in deviation) as shown in FIG. 9, this second embodiment can perform the required work satisfactorily. Therefore, an ultrasonic thickness gauge with lower cost by the portion saved through elimination of the aforesaid parts and structure can be provided.

In these first and second embodiments, the apparatus is designed such that the time of dealy of the monostable multivibrator is set by using the time constant of an RC circuit for timing. However, in the case where the setting is done by counting the specified number of the oscillation frequencies of the clock (pulse) oscillator, it can be designed to perform the correction by abating this count number. Also, it is possible to perform the measurement through averaging of one or plural times, after carrying out the adjustment of preliminary measurements.

I claim:

1. An ultrasonic thickness gauge comprising:
   a split-type probe to send and receive ultrasonic waves through a material board to be measured;
   a zero point calibration circuit to delay the zero point by a specified delay time from the transmission timing;

a measuring circuit to obtain the thickness of said board by counting clock pulses for a duration from the said zero point to a receiving timing;

and that is characterized in that it also includes:

a counter to count, within a specified range, the clock pulses applied to the board thickness of the material to be measured during each previous measurement performed by using the preset zero point; and a zero point adjusting circuit to vary the zero point of the zero point calibration circuit in proportion to the count value of said counter.

2. An ultrasonic thickness gauge for measuring the thickness of a board by using the integrated value obtained by a plural number of measurements, that comprises:

a split-type probe to send and receive ultrasonic waves through a material to be measured;

a zero point calibration circuit to delay the zero point by a specified delay time for a wave transmission timing;

a measuring circuit to count clock pulses for a duration starting from said zero point to a wave receiving timing;

and that is characterized in that it includes:

a counter to cumulatively count, within a given range, the clock pulses relating to the measurements from a first to a specified number of times, out of the plural number of the measurements; and a zero point adjusting circuit to vary the zero point of the zero point calibration circuit in proportion to a count value of said counter.

3. An ultrasonic thickness gauge comprising:

a split-type probe to send and receive ultrasonic waves by way of a material to be measured;

a zero point calibration circuit to delay a zero point by a specified delay time from a wave transmitting timing;

a measuring circuit to obtain the thickness board by counting clock pulses for a duration from said zero point to a wave receiving timing;

and is characterized in that it includes:

a counter to count, within a specified range, the clock pulses relating to the board thickness of the material to be measured that is obtained in the previous measurement made by using the preset zero point;

a zero point adjusting circuit to vary the zero point of said point calibration circuit, in proportion to a count value of said counter; and a coefficient selecting circuit to shift, in a stepwise manner, the proportionality coefficient of said zero point calibration circuit in accordance with the board thickness obtained by the previous measurement.

* * * * *